Feb. 16, 1926.
E. C. LAMPSON
1,573,720
PLUNGER CLEANING DEVICE
Filed Feb. 4, 1924
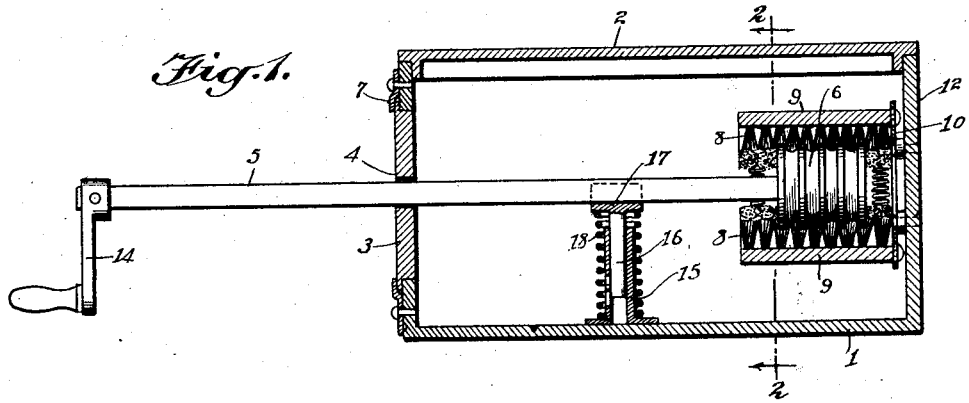
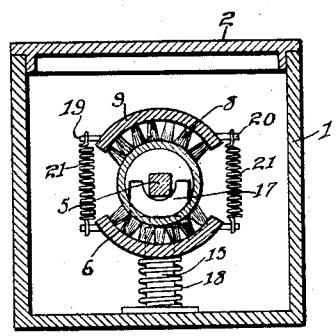
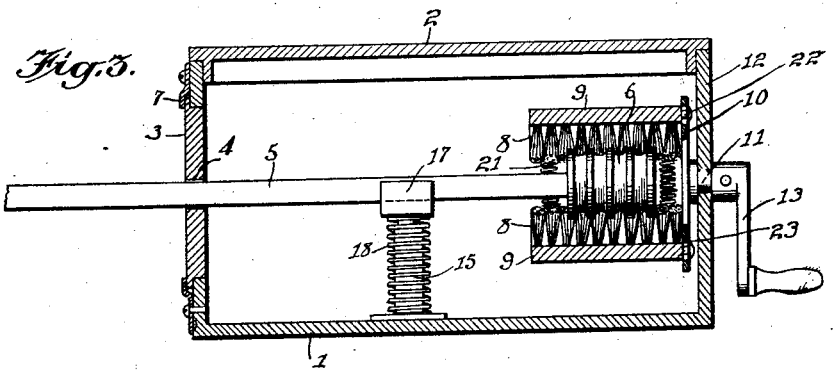
WITNESSES
INVENTOR
Edward C. Lampson
BY
ATTORNEYS Patented Feb. 16, 1926.

1,573,720

UNITED STATES PATENT OFFICE.

EDWARD CHESTER LAMPSON, OF JEFFERSON, OHIO.

PLUNGER-CLEANING DEVICE.

Application filed February 4, 1924. Serial No. 690,593.

*To all whom it may concern:*

Be it known that I, EDWARD C. LAMPSON, a citizen of the United States, and a resident of Jefferson, in the county of Ashtabula and State of Ohio, have invented a new and Improved Plunger-Cleaning Device, of which the following is a full, clear, and exact description.

This invention relates to a device for cleaning plungers. An object of the invention has to do with the provision of a simple and efficient device whereby plungers, which of necessity have to work in fluids which gradually coat their surfaces, may be simply and easily cleaned.

Another object concerns the provision of means whereby such plungers may be rapidly and simply cleaned in a manner to prevent the substance scraped therefrom getting into the atmosphere, especially in the case where such material is injurious to human beings.

A further object concerns the provision of a simple and efficient means whereby a plunger may be rapidly inserted in a dustproof casing and thoroughly and efficiently scraped or cleaned of its coating material with a minimum effort on the part of the operator.

The invention is illustrated in the drawings, of which—

Figure 1 is a vertical longitudinal section through the device;

Fig. 2 is a transverse vertical section on the line 2—2 of Fig. 1; and

Fig. 3 is a section similar to Fig. 1 showing a different means for producing relative rotation between the plunger and the brush frame.

The form of the invention shown in the drawings is a preferred form, although it is understood that modifications in the construction and arrangement of the parts and in the character of the materials used may be adopted without departing from the spirit of the invention as set forth in the appended claims.

In general, a preferred form of the invention concerns a device for removing oxide, metal, metal dust, dirt, rust or other substances which accumulate on plungers used in casting molten metal, especially those used in such machines as the linotype. The invention is further concerned with the provision for cleaning such plungers in such manner in a dustproof casing as to prevent the escape of said substances into the workroom to the detriment of the health of the occupants thereof. It is inconvenient to do such cleaning in the open air because the plunger grows cold rapidly and has to be warmed thoroughly before being placed into position in its respective casting position if it is allowed to cool too much, thus causing loss of time and operation.

To this end, I have provided a box or casing 1 which is provided with a cover 2 readily removable therefrom. This box is provided with a removable end plate 3 having an aperture 4 therein. Through this aperture 4 the stem 5 of a plunger or piston 6 is adapted to extend. The removable end plate 3 is held in position in the end of the box or casing by means of adjustable clips 7 but, of course, can be held in position by any other suitable means.

The plunger 6 is adapted to extend into the casing and to be disposed between a plurality of brushes such as 8 mounted on brush plates 9 which in turn are fastened to a brush-supporting frame 10. This frame is provided with a shaft 11 extending through the end plate 12 of the casing, and in the form shown in Fig. 3 this shaft is provided with a handle 13 whereby the brush-supporting frame can be rotated. In the form shown in Fig. 1, the brush-supporting frame is rigidly fastened to the end plate 12 of the casing and is not rotatable. In this latter case the relative rotation between the plunger 6 and the brushes is provided by rotating the plunger by means of a handle 14 radially fastened on the end of the plunger shaft 5 outside the casing. Preferably the aperture 4 is square since the stem 5 is preferably square, and in rotating the stem 5 by means of the handle 14 the end plate 3 also rotates. Intermediate the end plate 3 and the brush-supporting frame 10, and disposed on the bottom of the box 1, is a cylinder 15 in which a stem 16 reciprocates, the upper end of said stem formed as a saddle 17 on which an intermediate portion of the stem 5 rests. Against the end surface of this saddle a spring 18 bears, the other end of the spring being disposed against the bottom of the cylinder or the bottom of the box, as the case may be, this spring tending to hold the saddle upwardly and thereby keep the plunger 6 in close contact with the brushes.

Portions of the brushes and their plates are curved in shape so as to more effectively contact with the surface of the plunger. Each brush plate is provided with oppositely extending ears 19 and 20, and between corresponding ears on the brush plates springs such as 21 extend to normally pull the brush plates together. To permit of this slight movement of the brush plates, they are connected to the brush-supporting frames through rivets such as 22 which slide in small slots such as 23 in the brush-supporting frame 10. By means of this adjustment a slight relative movement toward and away from each other is permitted the brush-supporting plates.

In the operation of the device the plunger is inserted in the casing and the end plate slipped over the end of the shaft and fastened into place with the intermediate portion of the shaft resting on the saddle. In the form shown in Fig. 1 the handle 14 is turned to rotate the plunger, the saddle and its spring action keeping the plunger in intimate contact with the brushes.

In the operation shown in Fig. 3, the plunger is inserted as before but in this case instead of rotating the plunger, the brush-supporting plate or frame is rotated by means of the handle 13. As a matter of fact, of course, it is possible to rotate both the shaft 5 and the brush supporting frame, but this would merely double the relative speed of the brushes and the plungers and not give any more efficient action.

What I claim is:—

1. A plunger cleaning device, which includes a dustproof casing having an apertured removable end portion through which the shaft of a plunger is adapted to extend, a rotatable brush-supporting frame mounted on the opposite end of the casing and adapted to engage with the head of the plunger, means for rotating said brush-supporting frame exterior of the casing, and a saddle resiliently supported within the casing and adapted to support the shaft of the plunger intermediate the head and the removable end portion.

2. A plunger cleaning device, which includes a dustproof casing, a pair of brush plates supported therein, a brush-supporting frame on which said plates are mounted, said frame being slotted, means on said plates extending through said slots to permit a limited and free movement of the plates with respect to the frame, and spring means extending between the plates tending to pull them toward each other.

3. A plunger cleaning device, which includes a dustproof casing, a pair of brush plates supported therein, a brush-supporting frame on which said plates are mounted, said frame being slotted, means on said plates extending through said slots to permit a limited and free movement of the plates with respect to the frame, spring means extending between the plates tending to pull them toward each other, and means exterior of the casing and connected to the frame to rotate the same.

4. A plunger cleaning device, which includes a dustproof casing, a pair of brush plates supported therein, a brush-supporting frame on which said plates are mounted, said frame being slotted, means on said plates extending through said slots to permit a limited and free movement of the plates with respect to the frame, spring means extending between the plates tending to pull them toward each other, means exterior of the casing and connected to the frame to rotate the same, and a resiliently mounted saddle within the casing adapted to support the shaft of the plunger to be cleaned intermediate the frame and the end of the casing through which said shaft extends.

EDWARD CHESTER LAMPSON.